(12) United States Patent
Wendling et al.

(10) Patent No.: US 7,697,475 B2
(45) Date of Patent: Apr. 13, 2010

(54) PROCESSING A DATA STREAM FORMAT FOR MOBILE AUDIOVISUAL RECEPTION

(75) Inventors: Bertrand Wendling, Viroflay (FR); Christophe Oddou, Joinville le Pont (FR)

(73) Assignee: THOMSON Licensing S.A., Boulogne-Billancourt (FR)

( * ) Notice: Subject to any disclaimer, the term of this patent is extended or adjusted under 35 U.S.C. 154(b) by 821 days.

(21) Appl. No.: 10/548,234

(22) PCT Filed: Mar. 23, 2004

(86) PCT No.: PCT/EP2004/050352

§ 371 (c)(1),
(2), (4) Date: Oct. 20, 2006

(87) PCT Pub. No.: WO2004/086767

PCT Pub. Date: Oct. 7, 2004

(65) Prior Publication Data

US 2007/0041399 A1   Feb. 22, 2007
US 2008/0279215 A9   Nov. 13, 2008

(30) Foreign Application Priority Data

Mar. 26, 2003  (EP) .................................. 03290768

(51) Int. Cl.
H04L 12/50   (2006.01)
H04Q 11/00   (2006.01)

(52) U.S. Cl. .......................... 370/329; 455/522; 348/21; 370/407

(58) Field of Classification Search ................. 370/487, 370/261, 312, 537, 522, 260, 326, 534, 535; 348/21, 472, E7, E5; 375/E7, 240, 347; 714/786; 725/68, 73, 122, 131
See application file for complete search history.

(56) References Cited

U.S. PATENT DOCUMENTS

| | | | |
|---|---|---|---|
| 6,490,728 B1 * | 12/2002 | Kitazato et al. | ............. 725/151 |
| 2002/0129249 A1 * | 9/2002 | Maillard et al. | ............. 713/172 |
| 2002/0170053 A1 * | 11/2002 | Peterka et al. | ................ 725/31 |

(Continued)

FOREIGN PATENT DOCUMENTS

EP       0-959-574 A    11/1999

(Continued)

OTHER PUBLICATIONS

International Search Report dated Aug. 18, 2005 (2 pages).

(Continued)

*Primary Examiner*—Vincent P Harper
*Assistant Examiner*—Mahendra R Patel
(74) *Attorney, Agent, or Firm*—Osha • Liang LLP (57) ABSTRACT

The invention relates to a method for reception of a data stream, transmitted in segment in one or several broadcast channels, comprising a reception step for the data in a segment of data stream transmitted by an active broadcast channel. A step for changing reception channel allows switching from the current broadcast channel to a second channel after receipt of the data stream. A listening step on said second channel listens for an event identifying the transmission of the subsequent segment of the data stream and a step for changing reception channel by switching from said second channel to the current broadcast channel or another broadcast channel.

19 Claims, 5 Drawing Sheets

U.S. PATENT DOCUMENTS

2006/0045189 A1* 3/2006 Kim .................. 375/240.26
2006/0057957 A1* 3/2006 Yoo ..................... 455/3.04
2008/0016355 A1* 1/2008 Beun et al. ............. 713/172

FOREIGN PATENT DOCUMENTS

| EP | 1-253-721 A2 | 10/2002 |
|---|---|---|
| FR | 2829891 | 3/2003 |
| JP | 2002-135203 A | 5/2002 |

OTHER PUBLICATIONS

Machine Translation of Japanese Publication No. 2002-135203, Publication Date: May 10, 2002, 8 pages.

Office Action in Japanese Patent Application No. 2006-505485; mailed January 4, 2010, and English translation; 19 pages.

* cited by examiner

PROCESSING A DATA STREAM FORMAT FOR MOBILE AUDIOVISUAL RECEPTION

This application claims the benefit, under 35 U.S.C. § 365, of International Application PCT/EP04/050352, filed Mar. 23, 2004, which was published in accordance with PCT Article 21(2) on Oct. 7, 2004, in French and which claims the benefit of European patent application No. 03290768.5, filed on Mar. 26, 2003.

TECHNICAL FIELD

This invention relates to a method and a device for the transmission and reception of a digital data stream. More particularly, this data stream is transmitted and received in disconnected temporal segments.

This invention presents a particularly relevant application in the field of data stream transmission for systems such as digital television systems, and more specifically, for systems based on fixed or mobile terminals equipped with a low-energy capacity receiver and decoder.

THE PRIOR ART

The present invention relates to a transmission method and device as well as a reception method and device to be applied for example in the broadcast of terrestrial digital television on all types of terminals. The invention is intended for all types of format of digital multi-programme terrestrial services, e.g. LDTV (Limited Definition TeleVision), SDTV (Standard Definition TeleVision), EDTV (Enhanced Definition TeleVision), and HDTV (High Definition TeleVision), and for all types of terminals, both fixed terminals such as television sets as well as mobile terminals such as cellular telephones.

Digital television systems transmit information on various television channels to terminals via broadcast systems in a digital rather than an analogue form. The digital channels transporting the information from the television channels contain digital data streams encoded within a transmitter. This information is decoded in a terminal equipped with a digital decoder/receiver type of receiver. To facilitate interactivity, a return link may be provided either via the same medium as that used to deliver television channels or via another medium such as a telephone connection. Other types of data, such as digital audio, software and interactive data may be or are also transmitted. The term "digital television system" includes, for example, satellite, terrestrial, cable and other systems.

The term "receiver/decoder" includes a receiver for receiving either encoded signals or non-encoded signals, such as audio and/or video signals, preferably in MPEG format. These signals may be transmitted by various means. The receiver/decoder may for example comprise a set-top box connected to or integrated within a television set. It may be fixed or portable.

The term "MPEG" refers to the data transmission standard developed by the task group "Motion Pictures Expert Group" of the "International Standard Organisation" and in particular, but not exclusively, the MPEG-2 standard developed for digital television applications and the MPEG-4 standard and other MPEG-compatible standards. Within the framework of the present application, the term includes all MPEG variants, modifications and developments applicable to the transmission of digital data, including the DVB standard.

The broadcast systems are based, in this sense, on standards defined by the DVB consortium (Digital Video Broadcast) such as DVB-T (Digital Video Broadcast—Terrestrial).

The term "DVB" refers preferably to DVB standards developed by the DVB project of ETSI (European Telecommunications Standards Institute). Within the context of the invention, this term includes all variants, modifications and development of DVB formats applicable to the field of digital data transmission. These systems are defined as functional blocks of equipment effecting the adaptation of audiovisual signals to user device characteristics from the MPEG-2 input stream of the multiplexer. These systems are used intensively for the broadcast of digital television in the case of decoder/receiver type fixed devices and television.

The broadcast systems can supply a great quantity of data at relatively low cost, but offer little interactivity or personalisation of content since the same data is transmitted to all receivers in the sector covered.

These standards have been developed for fixed receivers/decoders, however today there is a rapidly growing demand for reception on all types of terminals at any location whatsoever.

The term "terminal" refers to an item of equipment containing a receiver/decoder and an item of display equipment. A terminal may be a conventional type terminal, i.e. one that includes a set-top box and a television, or it may be an item of mobile equipment, with a reduced size screen and of limited energy capacity. These terminals may be a portable combination of a digital television, a computer and mobile telephony technology providing mobile interactive Internet access. In actual fact, digital television in automobiles, buses and trains is an example of a service intended for mobile users. In addition, user demand for multimedia content in a mobile environment is increasing rapidly, in particular the demand for real time video stream. Mobility has also increased in importance and reaching users irrespective of their location at any time has thus become necessary.

Currently the fixed or portable audiovisual digital reception terminals are fed by mains supply and as a result the consumption of current has been subject to very limited optimisation. However, within the context of mobile reception of audiovisual data streams, manufacturers of terminals will have to face the real problem posed by the autonomy of power supply batteries, which implies an optimisation that may cast doubt on certain aspects of the entire system.

The devices used in effect are mobile terminals with weak batteries and a small antenna. Receiving large quantities of information does not allow the terminal to benefit from a long autonomy. In fact, energy consumption is such that the duration of use for a service would prove too short and thus can not be envisaged along the lines of existing techniques.

Figure 001:
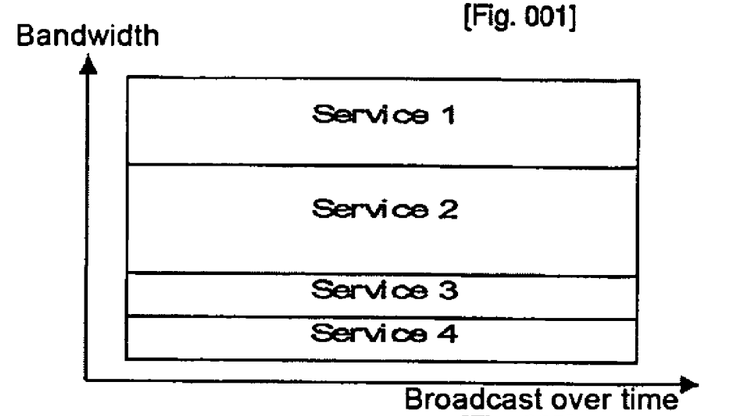

In addition, it has been observed that only approximately 5% of data transmitted by a broadcast system is really relevant to the user service, which implies that approximately 95% of the energy is used to receive non-useful data. FIG. 1 provides a diagram illustrating a broadcast according to the mode currently used. The band is shared between the various services that are transmitted continuously. A receiver solely interested in service 4 (i.e. approximately 10% of the total rate) has to continuously receive all the data (i.e. 100% of the total rate) and process it. The processing is performed by the reception units (tuner, antenna) and demodulation and demultiplexing units present in the receiver of the terminal.

One solution making it possible to reduce consumption would involve picking up only to the weak portion of the overall data stream. However, according to this transmission diagram for data streams, it is only possible to pick up to a portion of the band because it is shared continuously between a series of different services. The equipment has to receive the entire data steam to then perform the filtering.

Figure 002:
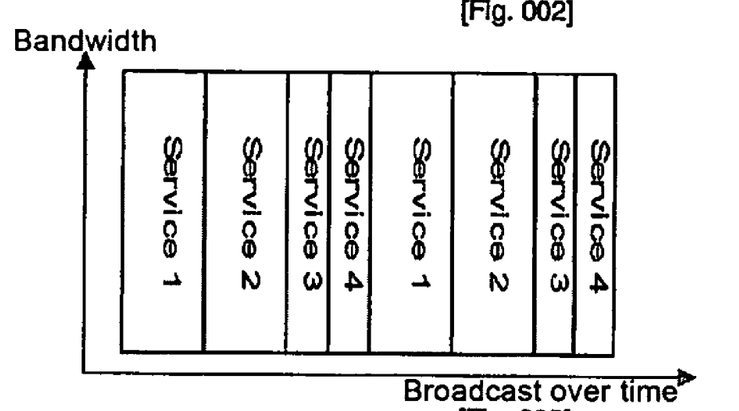

Assuming that a terminal is only intended to receive one single audiovisual service at any given moment from a service stream able to contain several, it would seem worthwhile to use this feature to define a transport structure based on temporal multiplexing. Instead of continually broadcasting a service onto a portion of the band, the service is transmitted onto successive, disconnected temporal segments occupying all or part of the ban for a period of time. This technique, known as "time slicing", is illustrated in FIG. 2. Each service, instead of being broadcast continuously, is thus transmitted in segments. Each segment of the data stream is transmitted at a higher rate than in continuous mode. In order to reconstitute a continuous audiovisual service, the receiver of the terminal has to receive these different segments and assemble them.

In this case, the receiver still interested in service 4 (representing 10% of the total band) does not start to receive until service 4 is broadcast, i.e. 10% of the time. For the remaining 90%, the reception, demodulation and demultiplexing units are not operational. There is thus a potential energy saving of 90%.

Implementing this technique involves introducing delay information between two segments into each segment of the data stream. This delay information is the non-operational time for the receiver's processing units that are doing the receiving, i.e. the reception, demodulation and demultiplexing units. At the end of this time, these units will wake up and receive the relevant data. The receiver thus knows the segment sequence for a data stream, and stops all data reception between the transmission of segments of the service.

Figure 003:
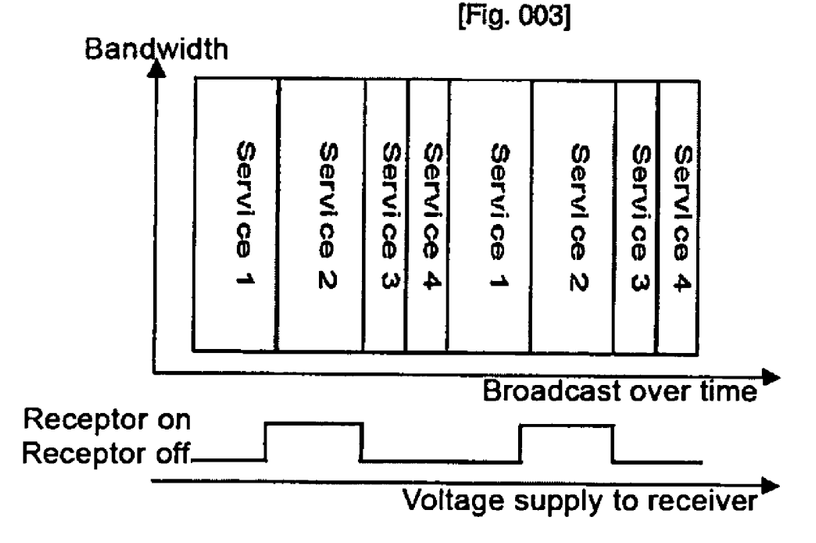

This technique uses the intelligence of the sequencing of the transmission. Its implementation requires that the transmission centre knows the delay between the transmission of two service segments and introduces this information into the segments of the data stream transmitted. The above-mentioned units thus function only during reception of the segment which is relevant for the user. These units are either switched off or on standby between transmissions. FIG. 3 shows the operation in run/off mode of the receiver, i.e. of the reception, demodulation and demultiplexing units.

During the transmission of services not selected by the user, the reception processing units remain switched off or on standby. They wake up at for a certain time period before the transmission of the user's service. This period corresponds to the delay necessary for the reception, demodulation and demultiplexing units to restart, synchronize themselves to the data stream received and prepare for processing the information received.

This technology thus offers certain advantages with regard to energy conservation. However it presents several disadvantages if it is used unmodified:

Operating the reception, demodulation and demultiplexing units in "all or nothing" mode creates current surges which provoke additional energy consumption to the extent that energy consumption is not likely to be reduced in proportion to the service selected.

Operating the demodulation unit in "all or nothing" mode reduces the service life of the components making up this unit by causing accelerated wear and tear.

Turning off the processing unit during reception implies that during wake up they will revert to reception on the channel on which they were receiving before they were turned off. This implies that if the user changes position, restarting the receiver may pose problems because the reception parameters, i.e. the identifier of the reception channel known by the receiver, will have been modified during the change from one reception area to another. Stopping the reception of information between the transmission of two service segments implies that it is no longer possible to receive signalling information and thus, amongst other things, that which the user is entitled to.

Hence technologies in use today, as described in the standards (DVB for example), are capable of delivering a high rate but the mobile terminals themselves are not capable of processing this information with sufficient autonomy. The object of the invention is thus to provide services which may be used by the mobile terminals without the disadvantages mentioned previously. It must therefore enable low power terminals to receive the services and information over a relatively long period (for example 4 hours) with reasonably sized batteries. It is thus necessary to reduce the consumption of the terminals as much as possible while at the same time not provoking premature wear and tear of the mobile terminal. In addition, the receiver/decoder must be adapted to changes of reception channel during changes from one reception area to another.

SUMMARY OF THE INVENTION

In a first aspect, the invention is directed to a method for receiving a data stream transmitted in segments over one or several broadcast channels comprising a step of receiver data of a segment of the data stream transmitted over a current broadcast channel, a step of changing reception channel to switch from a current broadcast channel to a second channel after reception of the segment from the data stream, a step of pick-up on this second channel on an event identifying the occurrence of the transmission of the following segment of the data stream, and a step of changing reception channel to switch from this channel to the broadcast channel or another broadcast channel.

This reception method is used to switch from a broadcast channel of a service to a second channel to prevent reception of unexpected services by the user. Reception of a data stream linked to a service consumes energy. This method implements a pick-up phase on a second channel, preferably at a much lower rate, for an event indicating the occurrence of the transmission of the following segment of the data stream. This method is thus used to reduce the energy consumption of the device implementing this procedure.

Preferably, the pick-up phase on this second channel comprises the reception of signalling information.

Preferably, the signalling information includes the users' entitlement (EMM).

According to this reception method and given that the reception of information is not stopped and that the second channel transmits all signalling information, user entitlement for example, the method is used to receive this signalling information including user entitlement with regard to an access control system.

More preferably still, the pick-up step on this second channel comprises the reception of an event identifying the occurrence of the transmission of the following segment of the data stream and may include the identification information from the broadcast channel on which the following segment of the data stream will be transmitted.

In actual fact the term "event" includes the identifier of the service that will be transmitted, and may include a certain amount of information used to switch from this second channel to a broadcast channel. When the user changes position, the service may be transmitted on a different broadcast channel at each segment and it is thus necessary to obtain information from the channel to which the switch is being operated.

In a second aspect the invention is directed to a method for transmission of a data stream in segment on a broadcast channel comprising a step of transmitting data stream on a broadcast channel, a transmission step on a second channel and a signalling information step corresponding to the data stream segments transmitted on the broadcast channel.

In the exemplary embodiment, the signalling information comprises user entitlement (EMM).

In the exemplary embodiment, the signalling information comprises events that identify the occurrence of the transmission of a segment of the data stream and that may include information relating to the identification of the broadcast channel on which the following segment of the data stream will be transmitted.

In a third aspect the invention is directed to a device for reception of a data stream transmitted in segment on one of several broadcast channels comprising means of data reception for a data stream segment transmitted on a current broadcast channel, means for changing the reception channel in order to switch from the current broadcast channel to a second channel after reception of the segment of the data stream, as well as a pick-up medium on this second channel for an event identifying the occurrence of the transmission of the following segment of the data stream, and a medium for changing the reception channel in order to switch from this second channel to the current broadcast channel or another broadcast channel.

According to the device of the invention, energy consumption is greatly reduced because the reception device only picks up on the broadcast channel during the service reception that it expects. It then switches to a second channel, preferably at a lower rate.

Similarly, given that the reception device has not been switched off between the transmission of two segments of a service, but continues to pick up on a second channel, there is neither the occurrence of current surges nor premature wear and tear of reception device components as a result of frequent power-offs.

In the exemplary embodiment, the pick-up medium on this second channel comprises the reception of signalling information.

In the exemplary embodiment, the signalling information comprises the user entitlement (EMM).

The reception device receives all signalling information, for example user entitlement, given that it picks up on this second channel when the service is not being transmitted on a broadcast channel.

In the exemplary embodiment, the pick-up medium on this second channel comprises the reception of an event that identifies the occurrence of the transmission of the following segment of the data stream and that may include information relating to the identification of the broadcast channel on which the following segment of the data stream will be transmitted.

The event must include the identifier of the service which is going to be transmitted, and may comprise a certain amount of information used to switch from this second channel towards a broadcast channel. In effect, when the user changes position, the service may be transmitted on a broadcast channel which differs for each segment. It is thus necessary to possess the information from the channel to which the switch is being made.

In the exemplary embodiment, the broadcast channel is a high rate channel.

In the exemplary embodiment, the other broadcast channel is a high rate channel.

In the even more exemplary embodiment, the second channel is a low rate channel.

Given that the second channel is a low rate channel, the energy consumption of the reception device is low.

In the exemplary embodiment, the second channel is a set of subcarriers.

For a particular embodiment using the standard DVB-T, the second channel transporting the signalling is formed by some of the subcarriers contained in the spectrum of a DVB-T channel.

In a fourth aspect the invention is directed to a device for data stream transmission in segment comprising data stream segment transmission means on a broadcast channel, transmission means on a second channel, signalling information corresponding to the segments transmitted on the broadcast channel.

In the exemplary embodiment, the signalling information includes events that identify the occurrence of the transmission of the following segment of the data stream and that may include information relating to the identification of the broadcast channel for this data stream.

In the exemplary embodiment, the signalling information contains user entitlement (EMM).

In the exemplary embodiment, the broadcast channel is a high rate channel.

In the exemplary embodiment, the second channel is a low rate channel.

In the exemplary embodiment, the second channel is a set of subcarriers.

BRIEF DESCRIPTION OF THE DRAWINGS

Other characteristics and advantages of the present invention will become clearer in the following description with reference to the corresponding appended figures in which:

FIG. 1 shows a two-dimensional representation of a diagram of a service broadcast channel according to a conventional mode for communication frequency multiplexing.

FIG. 2 shows a two-dimensional representation of a service transmission diagram by temporal segments.

FIG. 3 shows the start/stop operational mode of the receiving processing units during the service transmission according to FIG. 2.

FIG. 4 shows a schematic diagram block of a digital television system.

FIG. 5 shows a diagram block of a receiver/decoder managing the reception of the service transmitted by temporal segments.

FIG. 6 shows a scheme for permutation from the reception unit of the high rate data channel to a low rate signalling channel dependent upon the occurrence of a relevant service.

FIG. 7 shows a flowchart that may be implemented in the processing unit for signalling illustrating the programming of permutation from a high rate channel to a low rate channel and vice versa.

FIG. 8 shows a block diagram of a mobile audiovisual transmission system with transmission on two types of channels, a high rate channel and a low rate channel.

FIG. 9 shows the transmission of a stream at one and the same time according to the conventional transmission mode and the mode of transmission by temporal segments.

Figure 004:
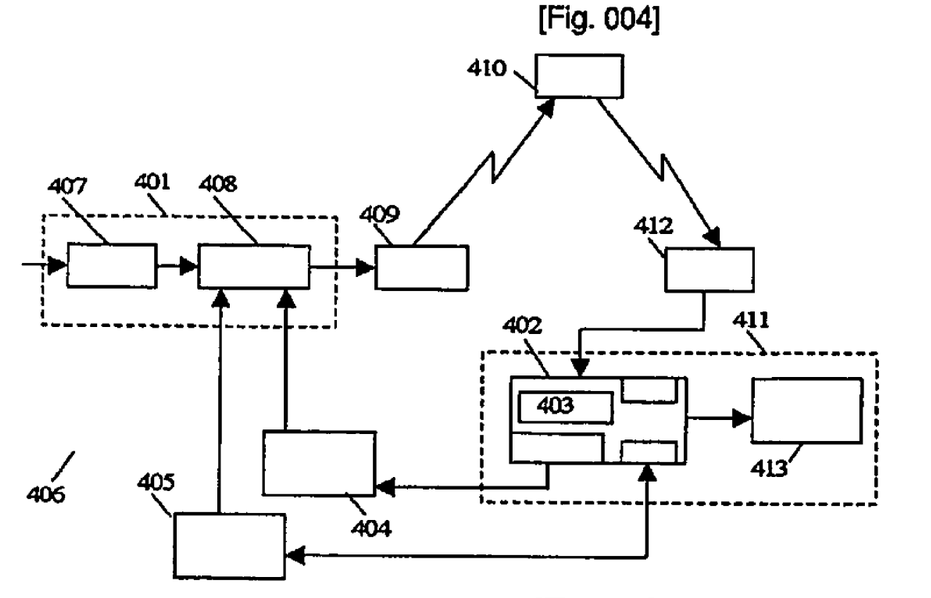

A 406 digital television system is shown in FIG. 4. This system 406 comprises a broadcast centre 401, a terminal 411 containing a receiver/decoder 402, a software or hardware architecture 403 of the receiver/decoder and an item of display equipment 413, an interactive system 404, and a conditional access system 405. This system includes a digital television system 406 using the MPEG-2 compression system known to transmit compressed digital signals. The MPEG-2 compressor 407 in the broadcast centre receives a digital stream, typically an audio and/or video signal stream, and transforms these streams into digital signals in MPEG-2 format. The compressor is connected by a link to a multiplexer and a scrambler 408. The multiplexer 408 receives a plurality of transformed sources and/or data (applications and applications data), gathers these sources on a single channel and transmits the compressed digital streams to a transmitter 409 (modulator, transmitting antenna) of the broadcast centre.

The broadcast centre transmits the data stream via a first link (satellite, terrestrial, cable, combination of two or more means of transmission) to a terminal 410 which will retransmit them via a second link to the receivers 412, through antennas for example. These data streams are transmitted on a certain frequency range known as bandwidth. This bandwidth is divided up into a certain number of elementary streams corresponding to a service. (see FIG. 1).

The signals received by the antenna 412 are transmitted to the receiver/decoder 402 of the user's terminal 411 to which an item of display equipment 413 is connected, such as a television. This receiver/decoder filters a portion of the overall data stream corresponding to the service expected by the user. The receiver/decoder then decodes the MPEG-2 signal compressed into a video data steam or other stream for the display device such as a television.

An interactive system 404 is connected to the multiplexer 408 and to the receiver/decoder 402 and is located partially in the broadcast centre 401 and partially in the terminal 411. It enables the end user to interact with a certain number of applications via a return channel. The return channel may be for example a PSTN channel (Public Switched Telephone Network) or a GPRS or UMTS channel.

A conditional access system 405 is also connected to the multiplexer 408 and the receiver/decoder 402 and is also located partially in the broadcast centre 401 and partially in the receiver/decoder 402. It enables the user to access digital television data transmissions broadcast from one or more providers. A smart card, capable of decrypting messages relating to commercial offers may be inserted in the receiver/decoder 402.

A part of the programmes transmitted by the broadcast system is encoded, the conditions and the encryption keys applied to a transmission being determined by the access control system. The encoded data are transmitted with a control word for decoding the data and the control word is itself encrypted by an operating key and transmitted in an encrypted form.

The encoded data and the encrypted control word are received by the receiver/decoder that has access to the operating key recorded in the smart card inserted in the receiver/decoder in order to the decrypt the encrypted control word and then decode the transmitted data.

The conditional access system contains an authorization system (Subscriber Authorization System—SAS). The SAS is connected to one or more subscriber management systems (Subscriber Management Systems—SMS) by a link which may be a TCP-IP link or another type of link. An SMS may also be shared between two commercial operators or an operator may use two SMSs, etc. The role of the SAS is to generate and deliver the user's subscription data. This data is recorded in the user's smart card. These rights are transmitted by messages known as EMM (Entitlement Management Message). The EMM contains the address of a single decoder and the operating key encrypted beforehand by a key peculiar to the smart card of the decoder considered.

The receiver/decoder contains a smart card that receives the entitlement of the subscriber received from the SAS. In fact, the smart card contains confidential information from one or more commercial operators.

Within the broadcast centre, the digital video signal is compressed initially using the MPEG-2 compressor. This compressed signal is then transmitted to the multiplexer in order to be multiplexed with other data such as interactive data.

The scrambler generates a control word used in scrambling processing and includes this control word in the MPEG-2 stream in the multiplexer. The control word enables the user's receiver/decoder to descramble the programme.

This control word is used to construct an ECM (Entitlement Control Message) and this message is transmitted with the scrambled programme. The control word is transmitted to a second encryption unit. In this unit, an ECM is generated, encrypted and transmitted towards the multiplexer/scrambler.

Each service broadcast by a provider comprises a distinct number of components: for example, a television programme includes a video component, an audio component, a subtitling component, etc. Each of these components of a service is individually scrambled and encrypted. An ECM is required for each of the components.

The multiplexer receives electrical signals comprising the encrypted EMMs of the SAS, the encrypted ECMs and the compressed and scrambled programmes. The multiplexer gathers this plurality of sources in a single channel and transmits the result to the broadcast system, which may be for example a satellite system or another broadcast system. The receiver demultiplexes the signals to obtain the scrambled programmes with the encrypted EMMs and ECMs.

The receiver receives the signal transmitted and extracts the MPEG-2 data streams. If the programme is scrambled, the decoder extracts the corresponding ECMs in the MPEG-2 stream and transfers the ECMS to the user's smart card. The smart card checks that the user is entitled to decrypt the ECMs and access the programme. If the user is not entitled to do this, the decoder indicates that the programme cannot be descrambled. If the user has the entitlement, the ECM is decrypted and the control word extracted. The decoder can then descramble the programme using the control word. The MPEG-2 stream is then decompressed and transmitted to the display device.

If the programme is not scrambled, no ECM will be transmitted with the MPEG-2 stream, and the receiver/decoder decompresses the data and transforms the signal into a video signal transmitted to the display device.

According to the invention, the different streams corresponding to several services entering the multiplexer/scrambler are multiplexed temporally, i.e. each service is divided into a set of temporal segments before being transmitted to the broadcast centre. A segment of each service is transmitted sequentially and this operation is then iterated in order to transmit the service in its entirety as shown in FIG. 2.

If for example the bandwidth is 30 megabits per second and the service 4 is transmitted according to the standard transmission scheme at a rate of 4 megabits per second, this service may be transmitted in the following manner during the transmission of this service according to the transmission scheme by data stream segment: the service is divided up into segments of 300 megabits, the transmission of this segment according to the bandwidth will be carried out in 10 seconds and the next segment to be transmitted will be transmitted 65 seconds later, after reception of the segment.

In order to save the energy available to the portable device, the reception, demodulation and demultiplexing units of the receiver of the terminal only receive on the broadcast channel during the transmission period of data relevant to the user.

Upon reception of a data stream segment from a service, the demultiplexing unit will store this information in a buffer. The MPEG-2 stream is characterised by a large number of packets. These packets are divided up as follows: a header indicating, amongst other things, the identifier of the service transported and a payload containing audio/video/data data. The MPEG2 standard (layer system) is based on the transmission of PCR temporal stamps (Program Clock Reference for a program in MPEG-2) used to reconstruct a clock system at decoder level. This clock is used to assure synchronous transmission with a constant delay between the encoder and the decoder of the audio and video elementary streams. To remain compatible with the MPEG-2 standard which imposes a very short repetition time for the PCRs associated with each audio/video program, the payload of the packets for the services transmitted in segments comprises data (for example one or several IP packets with audiovisual contents in MPEG-4 format) which removes the compatibility constraint with MPEG2 imposing permanent reception of PCRs for the audio and video elementary streams. The stream saved may differ in nature:

either the payload part alone of the MPEG-2 packets is memorized in the buffer, and thus the header of the message is suppressed.

or the stream is entirely saved in this buffer to be processed later.

The decoder will process the information contained in the memory to display this service subsequently. If the program is scrambled, the decoder uses the corresponding ECM in the MPEG-2 stream and switches the ECM to the user's smart card. The smart card checks that the use is entitled to decrypt the ECM and to access the programme. If the user is not entitled to do this, the decoder indicates that the program cannot be descrambled. If the user is entitled to do this, the ECM is decrypted and the control word extracted. The decoder can then descramble the programme using the control word. The MPEG-2 stream is then decompressed and transmitted to the display device.

Figure 005:
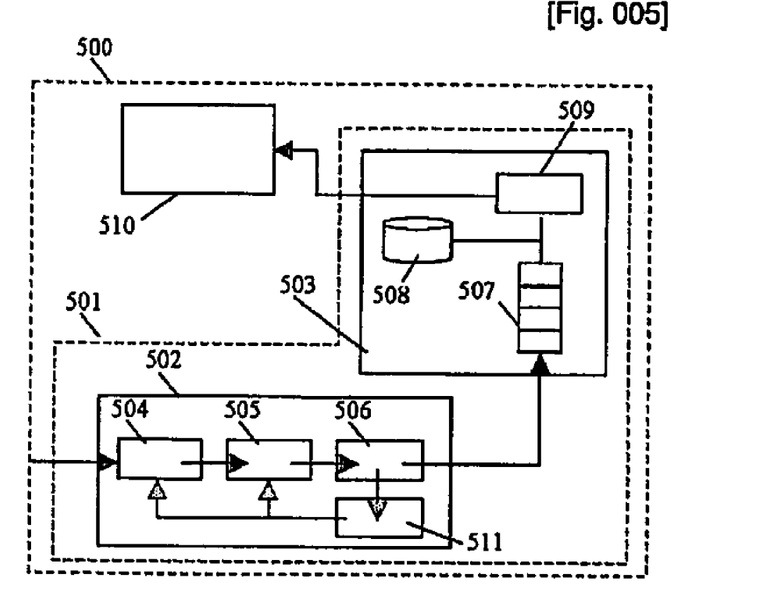

FIG. 5 shows an embodiment scheme illustrating the structure of a terminal 500 comprising a receiver/decoder 501 used to record the streams transmitted in a buffer memory 507 and display equipment 510. The receiver 502 manages the reception 504 of the MPEG-2 stream and returns this stream to the demodulator 505. This stream is then transmitted to the demultiplexer 506 which separates the various items of information transmitted in the stream (encrypted ECM, scrambled components) so that they can be descrambled later. According to the information received, the demultiplexer will transmit on the one hand the signalling information to the processing unit of the signalling 511 and on the other the audio/visual data in the buffer memory 507. The information read in the buffer memory is then read by the processing unit 509 of the decoder 503 which will descramble the programme if the programme is scrambled and if the user has the corresponding access entitlement. The result is transmitted to the display equipment 510. The role of the processing unit for signalling 511 is to process all signalling information. This information includes PSI (Program Specific Information) signalling, SI (Signalling Information) signalling presenting a means of navigation within a set of services and events, as well as the different tables manipulated by the implementation of the DVB standard, such as the SDT (Service Description Table) table, the BAT (Bouquet Association Table) table, the NIT (Network Information Table) table, etc.

The buffer memory 507 is a temporary memory which will contain all the information that enables the decoder to reconstitute the signal to be displayed during the loading of a segment and between two loadings. This memory is managed according to the FIFO mode (First In, First Out), and is implanted according to a circular memory. The size of this memory must be greater than the reception size of a loading segment. In our exemplary embodiment, the size must be greater than 300 megabits. A hard disk type storage memory 508 may also be used.

In order to avoid accelerated wear and tear of the receiver's components, the reception, demodulation and demultiplexing units will not be turned off. In effect, the invention does not stop reception during the time interval separating the transmission of two segments, but rather picks up a low rate signalling channel. Given that little information is transmitted on this type of channel, energy consumption is very low. This low rate signalling channel conveys the event that will indicate to the receiver the time and the channel on which the service will be transmitted during the next occurrence of the transmission of a service segment.

The term "low rate channel" means that a small portion of a bandwidth is involved. According to OFDM technology (Orthogonal Frequency Division Multiplexing) on which the DVB-T standard is based, a predefined set of subcarriers may be present.

According to the invention, the information indicating the next occurrence of the transmission of a segment of a service is no longer indicated in the segment transmitted previously, but an event transmitted on the signalling channel will initiate a change in reception channel for the receiver. The receiver will effectively switch to the high rate channel on which the relevant service will be broadcast. Contrary to the techniques shown previously where risks of desynchronisation may occur (for example, in the event of a transmission offset for the service corresponding, for example, to the reduction or the increase in the delay between two data segments) implying that a part of a service has not been received, the present invention cannot be subject to desynchronisation because it is based on a change of reception channel after picking up on event-type information indicating that the following segment of the relevant data stream will be transmitted.

The term "event" refers either to a structured message transmitted, or to the removal of an event, an exception, etc. The main embodiment examples are the use of a marking, a trigger, a synchronisation indication, a signal, a descriptor, etc.

The event indicating the occurrence of the transmission of the following segment of the data stream transmitted on the low rate channel contains at least the identifier of the service which will be transmitted.

This information may be transmitted, for example, by the transmission of a message containing a header in order to identify the type of message (e.g.: occurrence of a service segment, etc.) and a field containing the identifier of the service.

The mechanism used to find the broadcast channel on which a service is transmitted may be embodied in different ways. A first embodiment may be based on the transmission of the event identifying the occurrence of the next service and the information required to identify the broadcast channel on which the service will be transmitted. A second embodiment may be based on the tables transmitted conveying the following information:

the topology of the network (the cells) the frequency of each transponder in each cell the list of cells where each service can be accessed.

According to the scheme of a terminal, shown in FIG. 5, the reception unit 504 receives the data stream which it then transmits to the demodulator 505 and then to the demultiplexer 506. The demultiplexer 506, the next step in the processing of the reception will extract the signalling information from the stream and transmit it to the signalling processing unit 520. The latter has knowledge of the service selected by the user. When the user receives an event indicating to him the occurrence of the following segment of the data stream of the service, it transmits an order to the demodulator 505 and to the reception unit 504 in order to switch it to the reception channel.

Figure 006:
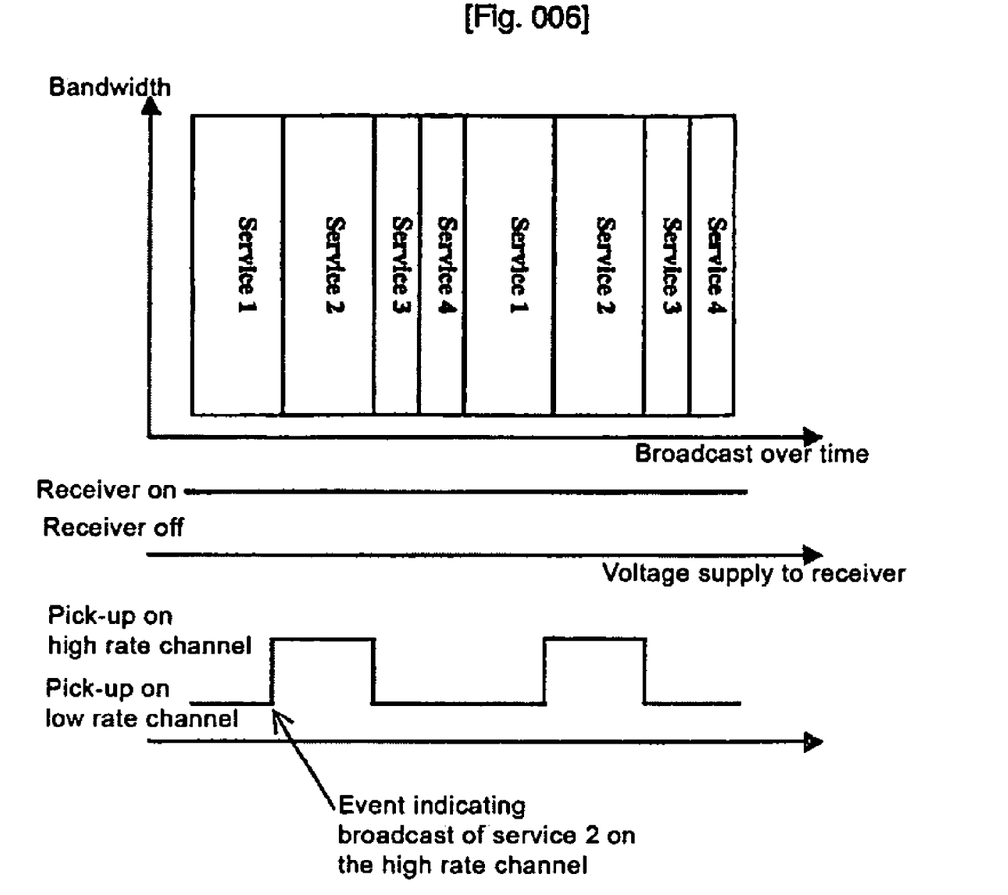

FIG. 6 shows the pick-up permutation of the receiver. In effect, when the high rate channel transmits a data stream which is not relevant for the user, the receiver is in pick-up mode on the low rate channel allowing a follow-up of events transmitted. When the following segment of the relevant data stream is signalled by an event, the receiver switches the receiver onto the high rate channel where the data stream relevant will be transmitted to the user on the basis of the service expected. After transmission of the relevant service, the receiver returns to pick-up mode on the low rate signalling channel.

The event indicating a service occurrence is transmitted as shown in FIG. 6 a certain amount of time before the start of the effective transmission of the service. This amount of time corresponds to the delay used by the receiver to switch from the low rate channel to the broadcast channel for which the identifier has been transmitted and to synchronize itself according to the high rate channel.

After switching, the demodulation unit will synchronize itself on the high rate channel and the demodulator will manage the recovery of the synchronization at the rate of the transfer of data.

The synchronization of the demodulator on a channel is performed either using parameters transmitted in the signalling information or using static parameters known by the demodulator without having to recover them on the signalling stream. These parameters contain the frequency of the transmitter transponder of the service.

Thus as soon as synchronization information is received on the signalling channel which announces the start of the transmission of a segment of the service selected, the demodulation parameters will be read from the signalling information and the carriers of the channel will be demodulated.

To perform the switch, the tuner selects the channel on which the switch is to be made. The identifier of the channel and its reception parameters having been previously transmitted on the signalling channel. The tuner then transposes this channel and performs the required filtering; the amplified signal is demodulated in a coherent manner to provide the output-analogue I and Q signals. The signal I is used to modulate a non-phase-shifted output of the local oscillator, and the Q signal modulates the phase-shifted output of $\pi/2$ of this same oscillator. The recovery of the phase of the carrier, required for correct demodulation, occurs in conjunction with the following stages by means of a frequency loop which is used to control the phase of the oscillator of the demodulator. The I and Q signals are each applied to an analogue/digital converter. This is typically a double converter capable of sampling the signal. The demodulator, in addition to the clock and carrier recovery functions, performs additional filtering (e.g. Nyquist half filtering) applied to the transmission on the I and Q signals. A transmission error correction module (FEC: Forward Error Correction) distinguishes the 0s and 1s using a majority logic, then performs all the error corrections (for example, Viterbi decoding, de-interleaving, decoding and descrambling). The demultiplexer is used, by means of filters, to select MPEG elementary streams (PES: Packetized Elementary Stream).

After the synchronization phase, the demultiplexer receives all the packets transmitted on the broadcast channel. If the packets transmitted and received by the demultiplexer do not correspond to the service expected by the user, i.e. the identifier of the service contained in the header of the packets does not correspond to the expected service, the packets are then ignored. However as soon as a packet contains the correct header, i.e. contains the identifier of the service expected, the demultiplexer starts transmitting the result of its processing in the buffer memory for the audio/video data.

The end of the transmission of a service segment may be processed in a different manner. An initial solution is as follows: when the identifier of the packets received changes, i.e. the segment of the relevant service is totally transmitted and the segment of the following service begins to be transmitted, the reception unit quits the high rate broadcast channel to switch to reception mode on the low rate signalling channel conveying the signalling information.

A second possible solution involves using a signalling event at the end of the segment, this event serving as a marker for the end of transmission of a segment. This event will be processed by the processing unit of the signalling and the latter will order the switching of the reception channel.

The receiver then goes into pick-up mode for the next event indicating to it the occurrence of the service relevant to the user.

The low rate signalling channel also conveys all the other signalling information (PSI, SI, BAT tables, NIT, etc.). This channel also transmits personalized data such as users' EMMs in order to update entitlements linked to the user's subscription.

The term "table" refers in an exemplary embodiment to a data structure with a header with a fixed length and a body of variable length, and preferably refers to a data structure such as that commonly used in digital transmission systems, for example the data structures based on the MPEG and DVB standards. The term "table" includes the MPEG/DVB tables such as defined in the standards but also other tables scheduled to be used with the transmission systems based on MPEG/DVB.

Thus in the solution proposed, events signalling the occurrence of a service are inserted in the signalling channel conveying the classic signalling in order to indicate to which channel the receiver must switch in order to receive the data stream corresponding to the data of the service selected by the user. These events are transmitted sufficiently in advance to allow the receiver to be positioned on the correct high rate channel.

In one particular embodiment which would ensure optimum operation of the DVB-T standard for terrestrial digital modulation, the signalling channel is conveyed for each DVB-T channel by some of the sub carriers contained in the spectrum of a DVB-T channel.

According to the DVB-T standard, two operating modes are defined: the "2K mode" and the "8K mode". According to this standard, 1705 subcarriers exist in 2K mode and 6817 subcarriers in 8K mode. Thus, outside the transmission of a segment of the data stream relating to the service selected, the OFDM demodulator of the receivers would only demodulate some subcarriers of the signal on which the receiver is in pick-up mode, these subcarriers conveying the signalling information. Some moments before the occurrence of the transmission of a service segment relevant to the receiver, the information received may indicate the channel on which this service is transmitted.

According to this embodiment, the event indicating to the receiver the occurrence of the transmission on a high rate channel of the relevant service, information such as the EMMs, the identifier of the terminal which will broadcast the relevant service and the identifier of the channel are all transmitted, for example, on a set of subcarriers. This set of subcarriers allows a limited bandwidth to transmit the signalling. Thus, according to this embodiment, the signalling channel is translated by a set of subcarriers used to produce a low rate channel.

Figure 007:
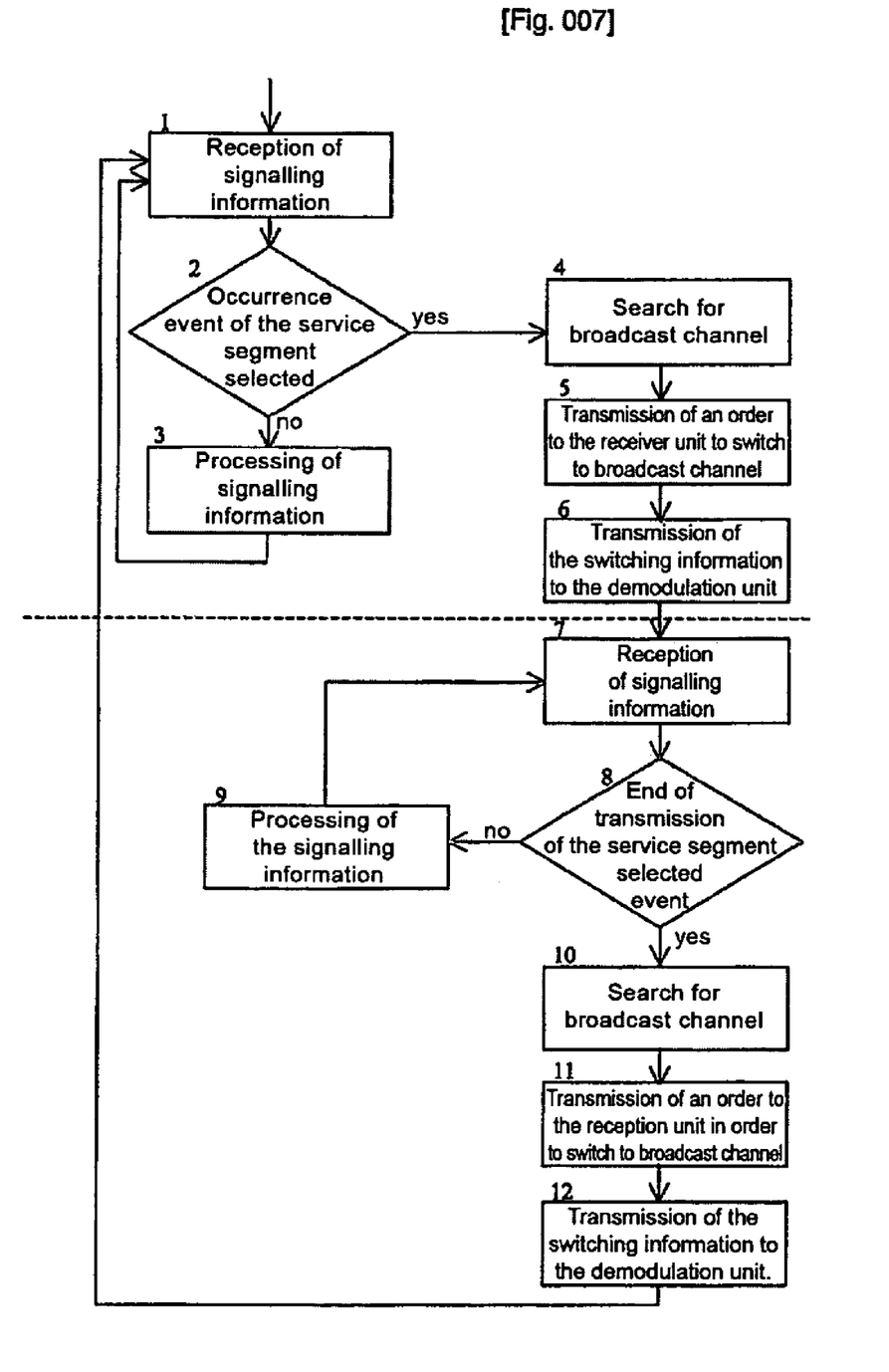

FIG. 7 shows one possible implementation of the management mechanism for the switching of the reception channel by the processing unit of the signalling. This operation is now described in more detail. When the receiver is on pick-up standby for the signalling channel, the processing unit of the signalling will receive all the signalling data (1). If amongst this data, an event is transmitted indicating the occurrence of the transmission of the following segment of the data stream of the user service (2), the processing unit of the signalling will then perform a certain number of steps (4 to 6) in order to switch the receiver to a. broadcast channel, otherwise this unit continues in pick-up mode and processes the signalling information (3).

The switch from the receiver of the low rate signalling channel to a high rate broadcast channel will be piloted by the processing unit of the signalling. Initially, this unit will search for the broadcast channel on which the next service segment is to be transmitted (4) either in the information transmitted with the occurrence event of the service or using the tables described above (topology table of the network, table of frequencies, table of cells, etc.). After having identified this broadcast channel, the processing unit of the signalling will transmit a switching order to the reception unit on this channel (5). An order will also be transmitted to the demodulation unit in order to inform it of the change in status of the receiver. (6)

After having transmitted these commands, the processing unit for the signalling will receive a set of signalling data (7) which is transmitted at the same time as the audio/visual data. As long as the signalling information does not contain an end of transmission marker for a segment of the user service (8), the processing unit of the signalling continues on pick-up standby for signalling information. On reception of the end of transmission marker for a service segment, the processing unit of the signalling will initiate the switching of the receiver to a low rate signalling channel (10 to 12).

To achieve this, the signalling processing unit will find a low rate channel on which the receiver will be able to switch either in a stored value or in the tables described above (10). An order will then be transmitted to the reception unit in order to indicate to it the channel on which the switch is to occur (11). The demodulation unit will also be informed (12). The signalling processing unit will revert to a behaviour pattern as described as from step (1).

Terrestrial Mode with Change of Terminals

In digital terrestrial transmission, the receiver of the mobile terminal can receive data from different transmitters situated in a sector of the receiver. The sector covered by a transmitter is known as a cell. A region may be covered by numerous cells and each can have a different size. The cells cover each other in order to ensure the continuity of the service in all the sectors. According to DVB-T transmission technology, when a receiver of a mobile terminal is situated in a cell, it knows the adjacent cells so that it can switch to the most powerful and best data stream received. To ensure that the receiver does not have to scan the entire frequency range or find out which transmitters are available and how to use the services, each transmitter broadcasts information on the adjacent transmitter. The receiver can then skip directly to the relevant channel and obtain good reception. To obtain this information concerning the network topology, it is important that the receiver be able to monitor the information concerning each cell and the adjacent cells. If, in the event of transmission by data stream segment, the receiver is completely turned off between data stream broadcast segments, as known in the state of the art, it is not possible to change cells.

According to the invention, the receiver always receives signalling information on a low rate channel and thus may choose when it has to change reception channels in order to ensure the continuity of the service. It may also choose on which cell to start receiving.

The signalling information thus also contains both the service information for the cell as well as the service information accessible on the adjacent cells.

Thus according to this technology, small mobile terminals with limited energy capacities many be used very frequently by mobile users (in automobiles, trains, etc.) or in sectors that possess a large number of small local transmitters (for example, in order to transmit publications within large supermarkets, to indicate parking areas in cities, to broadcast film programmes, to keep airport users informed . . . ). As a result it is important to ensure a continual quality of service while at the same time ensuring that the receiver does not have to scan the cells when turned on again in order to discover the receiving channel and the list of services for the new cell on which it is receiving.

Figure 008:
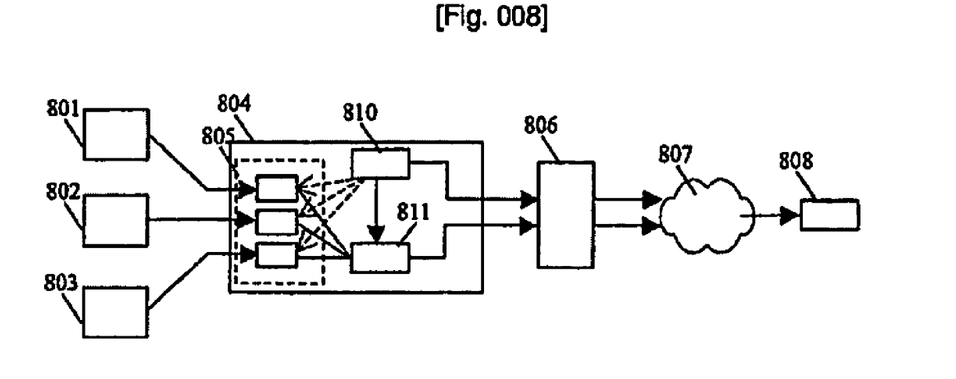

FIG. 8 presents a possible embodiment of a mobile audiovisual transmission system according to the invention.

The units 801, 802 and 803 are IP servers each broadcasting an audiovisual content in multicast in, for example, MPEG-4 format at a few hundred kilobits per second. These different sources each offer services to the user. This MPEG-4 format is particularly adapted to the provision of video, audio for terminals with a weak display capacity. Each of these units supplies a video, audio and data stream (either of the application type or application data type). These streams are inserted in a set of memories 805 in the unit 804 in order to be processed and transmitted. Each source (units 801, 802, 803) is associated with a memory used to store the service offered by the memory.

Unit 804 contains an encapsulation unit 811, the MPE-DVB system (Multi-Protocol Encapsulation) for example, intended to encapsulate the IP packets transmitted by the IP servers 801, 802 and 803 which are present in the memory 805 in MPEG-2 packets with a single and fixed identifier per service.

The control and sequencing unit 810 will divide the service temporally, i.e. the IP packet flow of the services present in the memories 805, into temporal segments. To achieve this, it transmits orders to the encapsulation unit 811 specifying to it the IP packet streams by indicating the memory 805 in which the stream and size (corresponding to the segment) of the information to be processed are to be found.

The resulting MPEG-2 stream is injected either into a multiplexer which after processing will be transmitted to the modulator 806 or directly into the modulator 806, of type DVB-T for example. A control and sequencing unit 810 generates the events which will be transmitted on a signalling channel.

These events reflect the identifier of this service a certain amount of time before the transmission of a service segment. This control and sequencing unit 810 is connected to the unit 804 in order to generate the event corresponding to the segment processed by the encapsulation unit 811 and which will be transmitted shortly. This signalling stream associated with the services transmitted on the high rate channel is also transmitted in parallel to the modulator 806. This modulator 806 transmits the result of the processing of the encapsulation unit on a high rate channel and the signalling stream on a low rate channel. These two channels (high and low rate) are transmitted through the network 807 and are received by the receivers 708 of the user terminals.

In a particular implementation using the terrestrial digital modulation DVB-T standard, the signalling stream will be conveyed for each DVB-T channel by some of the subcarriers contained in the spectrum of a DVB-T channel.

Figure 009:
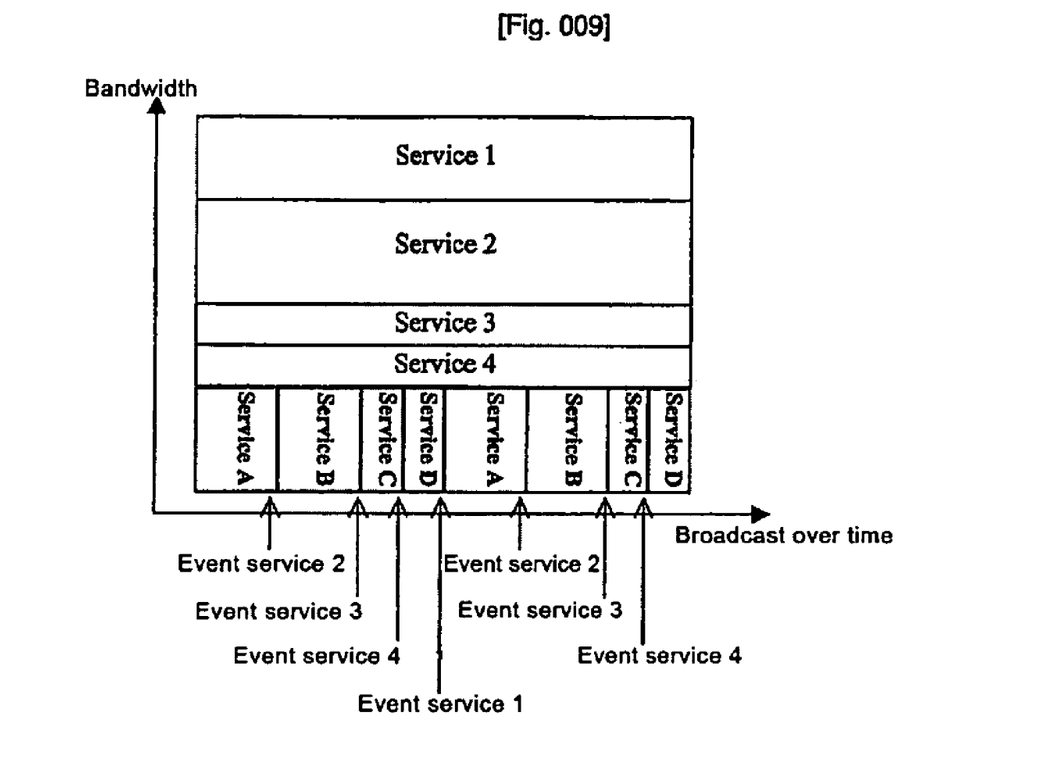

According to another feature of the invention, the stream transmitted may contain simultaneously conventional MPEG-2 services (services 1, 2, 3, 4) and services transmitted in segment, as shown in FIG. 9. According to this diagram, the receiver can receive both services transmitted in a conventional way and services transmitted in segments. Thus, if the user of a terminal with a weak capacity has selected a divided service, for example service A, the receiver picks up on the low rate signalling channel in expectation of the event that indicates that it should switch to the high rate channel which will transmit the relevant service for the user. The information from the relevant channel is also transmitted. During the transmission, the receiver/decoder will fill its buffer memory with the information transmitted. After reception of the relevant data stream segment, the receiver once again goes into pick-up standby on the signalling channel in order to detect the next event, i.e. the following occurrence of the transmission of the segment of the data stream.

This transmission diagram may be organised as follows: the bandwidth is divided into two parts, the first part intended for the transmission of continual data streams for standard terminals, and the second part intended for the transmission of data streams in segments for terminals with weak energy capacity and reduced display format. The first part may represent a large section of the bandwidth whereas the second part represents a very small section, in effect, the information mass transmitted continuously for terminals with strong processing capacity is much greater. The quantity of information for the display of a service on a terminal with a reduced display format is small.

A storage device in the receiver/decoder may also comprise a hard drive. The receiver/decoder must thus be equipped with writing means to write the data onto the hard drive. The hard drive may include two storage areas, a recording area in order to display the service subsequently and a saving area with a certain quantity of information enabling the user to display his service in time shifting. This memory area may be implanted according to a circular memory on the hard drive, in order to record only a limited quantity of information for which the display is to be shifted.

The advantage of this invention is to enable the receiver to receive data relevant to the user on a high rate channel when this data is transmitted and all the signalling information relating to the network and the individual information (EMM) on a low rate channel. Energy consumption is substantially reduced because stream reception on a low rate channel engenders little energy consumption. In addition, there are no current surges as the receiver is not stopped and restarted with high regularity and thus there is no premature wear and tear of the components of the receiver. Another major advantage is use of the invention for implementation in a terrestrial digital television context. Effectively, according to the invention, the receiver, at the moment of the arrival of the occurrence of a service, has the information required to switch immediately onto the appropriate transmitter.

The invention claimed is:

1. A method for receiving a data stream transmitted in segments on one or more broadcast channels comprising:
   receiving data in a segment of the data stream transmitted on a current broadcast channel,
   changing a receiving channel for switching from the current broadcast channel to a second channel after having received the segment of the data stream,
   picking-up an event on the second channel comprising reception of signalling information transmitted on the second channel, said signalling information comprising the event identifying the occurrence of the transmission of a following segment of the data stream, and
   changing the receiving channel for switching from the second channel to the current broadcast channel or another broadcast channel on which the following segment of the data stream is transmitted.

2. The method according to claim 1, wherein the signalling information includes the user entitlement rights (EMM).

3. The method according to claim 1, wherein picking-up the event on the second channel further comprises identification information for the broadcast channel on which the following segment of the data stream will be transmitted.

4. A method of transmission of a data stream in segments on a broadcast channel comprising:
   transmitting a data stream segment on a broadcast channel,
   transmitting on an intermediate second channel, signalling information corresponding to the data stream segments transmitted on the broadcast channel,
   wherein said signalling information comprises an event identifying the occurrence of the transmission of a following segment of the data stream, wherein the following segment is a segment of the data stream transmitted after the data stream segment.

5. The method according to claim 4, wherein the signalling information further comprises the identification information for the broadcast channel on which a following segment of the data stream will be transmitted.

6. The method according to claim 4, wherein th signaling information comprises user entitlement rights in the form of an entitlement management message (EMM).

7. A reception device for a data stream transmitted in segment on one or more broadcast channels, comprising:
   means for receiving data from a segment of the data stream transmitted on a current broadcast channel,
   means for changing a receiving channel in order to switch from the current broadcast channel to a second channel after having received the segment from the data stream,
   means for an event on the second channel comprising reception of signalling information transmitted on the second channel, the signalling information comprising of the event identifying the occurrence of the transmission of a following segment of the data stream, and
   means for changing from the receiving channel in order to switch from this second channel to the current broadcast channel or another broadcast channel on which the following segment of the data stream is transmitted.

8. The reception device according to claim 7, wherein the signalling information comprises user entitlement rights (EMM).

9. The reception device according to claim 7, wherein the means for picking-up on the second channel comprise the reception of an event identifying the occurrence of the transmission of the following segment of the data stream and the identification information for the broadcast channel on which the following segment of the data stream will be transmitted.

10. The reception device according to claim 7, wherein the current distribution channel is a high rate channel.

11. The reception device according to claim 7, wherein the other broadcast channel is a high rate channel.

12. The reception device according to claim 7, wherein the second channel is a low rate channel.

13. The reception device according to claim 7, wherein the second channel is a set of subcarriers.

14. A transmission device for a data stream in segments, comprising:
   means for transmission of segments of data streams on a broadcast channel,
   means for transmission on a second channel of signalling information corresponding to the segments transmitted on the broadcast channel, wherein the signalling information comprises an event identifying a transmission of a following segment of the data stream.

15. The transmission device according to claim 14, wherein the signalling information further comprises the identification information for the broadcast channel for this data stream.

16. The transmission device according to claim 14, wherein the signalling information comprises user entitlement rights (EMM).

17. The transmission device according to claim 14, wherein the current broadcast channel is a high rate channel.

18. The transmission device according to claim 14, wherein the second channel is a low rate channel.

19. The transmission device according to claim 14, wherein the second channel is a set of subcarriers.

* * * * *